United States Patent

Takada et al.

[11] Patent Number: 5,309,256
[45] Date of Patent: May 3, 1994

[54] METHOD OF AND APPARATUS FOR PROCESSING IMAGE AND CORRECTION CHART EMPLOYED IN THE APPARATUS

[75] Inventors: Yoko Takada, Minami-ashigara; Tadashi Miyakawa, Ashigarakami, both of Japan

[73] Assignee: Fuji Photo Film Co., Ltd., Kanagawa, Japan

[21] Appl. No.: 769,705

[22] Filed: Oct. 2, 1991

[30] Foreign Application Priority Data

Oct. 3, 1990 [JP] Japan .................................. 2-265808
Oct. 1, 1991 [JP] Japan .................................. 3-252659

[51] Int. Cl.$^5$ .......................... H04N 1/46; G03F 3/08
[52] U.S. Cl. ..................................... 358/504; 358/518
[58] Field of Search ................. 358/80, 406, 504, 518, 358/520, 521

[56] References Cited

U.S. PATENT DOCUMENTS

4,717,954  1/1988  Fujita et al. ............................ 358/80
4,839,722  6/1989  Barry et al. ............................ 358/80

*Primary Examiner*—Edward L. Coles, Sr.
*Assistant Examiner*—Scott A. Rogers
*Attorney, Agent, or Firm*—Sughrue, Mion, Zinn, Macpeak & Seas

[57] ABSTRACT

Disclosed herein are a method of and an apparatus for electrically processing an image, and a calibration chart used in the apparatus. This method comprises a first process for measuring respective spectral densities of a calibration chart having at least three regions at which respective ones of three primary color dyes in a color photosensitive material are developed, a second process for determining data indicative of the quantity of the three primary color dyes in the regions from the spectral densities obtained in the first process, a third process for determining color calibration data from density data of the regions, the density data being obtained by reading the calibration chart with an image reading apparatus, and the data indicative of the quantity of the primary color dyes in the regions, the data being obtained in the second process, and a fourth process for correcting density data obtained by reading an original having the same color development characteristic as that of the calibration chart with the image reading apparatus, by making use of the color correction data obtained in the third process. In addition, the apparatus comprises a dye-quantity data storage unit, an original reading unit, a color calibration data arithmetic unit, a color calibration data storage unit and a calibration density data arithmetic unit.

13 Claims, 7 Drawing Sheets

METHOD OF AND APPARATUS FOR PROCESSING IMAGE AND CORRECTION CHART EMPLOYED IN THE APPARATUS

BACKGROUND OF THE INVENTION

1. Field of the Invention

The present invention relates to a method of and an apparatus for electronically processing an image, wherein stable color reproduction can be carried out in an image input/output apparatus, and to a correction chart suitable for use in the apparatus.

2. Description of the Related Art

An image scanning, reading, and reproducing system is widely used in the printing and platemaking fields, for example, for electronically processing image information stored in an original to be read so as to produce an original film plate with a view toward simplifying the entire process and improving the quality of printed images.

In an image reading apparatus which constructs the image scanning reading and reproducing system, an original positioned and stored in an original cassette is scanned to read image information.

In the image reading apparatus, in order to produce a film plate according to the purpose, a pre-scan operation is carried out to initially feed the original cassette to a reading unit and to set up processing conditions such as magnification, image processing, etc. Then, a mainscan operation is performed to set up the optimum processing conditions based on image information obtained by the pre-scan operation and to read image information again in accordance with the processing conditions referred to above.

When it is desired to subject the image information to the pre-scan operation and then to the mainscan operation in the above-described manner, the image processing conditions are automatically set up, thereby carrying out the image processing. However, there is no adequate method of processing color separation and correction. In addition, operation is inefficient because color adjustment is made for each original.

SUMMARY OF THE INVENTION

It is a principal object of the present invention to provide a method of and an apparatus for electronically processing an image, wherein respective colors of an image recorded in an original can be separated and corrected with high accuracy and the color reproduction can stably be carried out irrespective of an original characteristic, and to provide a calibration chart suitable for use in the apparatus.

It is another object of the present invention to provide a method of electronically processing an image, the method comprising a first process for measuring respective spectral densities of a calibration chart having at least three regions where respective ones of three primary color dyes in a color photosensitive material are developed, a second process for determining data indicative of the quantity of the primary color dyes in the regions from the spectral densities obtained in the first process, a third process for determining color correction data from density data of the regions, the density data being obtained by reading the calibration chart with an image reading apparatus, and the data indicative of the quantity of the primary color dyes in the regions, the data being obtained in the second process, and a fourth process for correcting density data obtained by reading an original having the same color development characteristic as that of the calibration chart with the image reading apparatus, by making use of the color correction data obtained in the third process.

It is a further object of the present invention to provide the method wherein each of data indicative of the quantity of the primary color dyes measured in the second process is of a value of peak density of each primary color dye at each of the regions.

It is a still further object of the present invention to provide the method wherein the data determined in the second process is free from data indicative of the quantity of dyes in a film base of the calibration chart.

It is a still further object of the present invention to provide the method wherein the calibration chart includes regions for respective color steps of Y, M, C, R, G and B.

It is a still further object of the present invention to provide the method wherein the calibration chart includes the regions for the respective color steps of Y, M, C, R, G and B, and regions for three gray color steps having densities different from one another.

It is a still further object of the present invention to provide the method wherein the calibration chart includes the regions for the respective color steps of Y, M, C, R, G and B, the regions for the three gray color steps having the densities different from one another, and a region for a color step having the density of a film base of a color photosensitive material.

It is a still further object of the present invention to provide an image processing apparatus comprising means for storing therein data indicative of the quantity of dyes in respective regions of a calibration chart having at least three regions where respective ones of three primary color dyes in a color photosensitive material are developed, means for reading the calibration chart and an original having the same color development characteristic as that of the calibration chart, color-correction data arithmetic means for computing color correction data from density data obtained by reading the calibration chart with the reading means, and the data stored in the storing means, means for storing therein the color correction data, and correction density data arithmetic means for computing correction density data from density data obtained by reading the original with the reading means and the color correction data stored in the color correction data storing means.

It is a still further object of the present invention to provide the image processing apparatus wherein the calibration chart includes regions for respective color steps of Y, M, C, R, G and B.

It is a still further object of the present invention to provide the image processing apparatus wherein the calibration chart includes the regions for the respective color steps of Y, M, C, R, G and B, and regions for three gray color steps having densities different from one another.

It is a still further object of the present invention to provide the image processing apparatus wherein the calibration chart includes the regions for the respective color steps of Y, M, C, R, G and B, the regions for the three gray color steps having the densities different from one another, and a region for a color step having the density of a film base of a color photosensitive material.

It is a still further object of the present invention to provide a calibration chart comprising respective color steps of Y, M, C, R, G, and B, the color steps including three primary color dyes of a color photosensitive material and dyes obtained by mixing the primary color dyes with one another, three gray color steps having densities different from one another, the color steps including dyes obtained by mixing the three primary color dyes with one another, and a color step having the density of a film base of a color photosensitive material.

The above and other objects, features and advantages of the present invention will become apparent from the following description and the appended claims, taken in conjunction with the accompanying drawings in which a preferred embodiment of the present invention is shown by way of illustrative example.

DETAILED DESCRIPTION OF THE PREFERRED EMBODIMENTS

Figure 1:
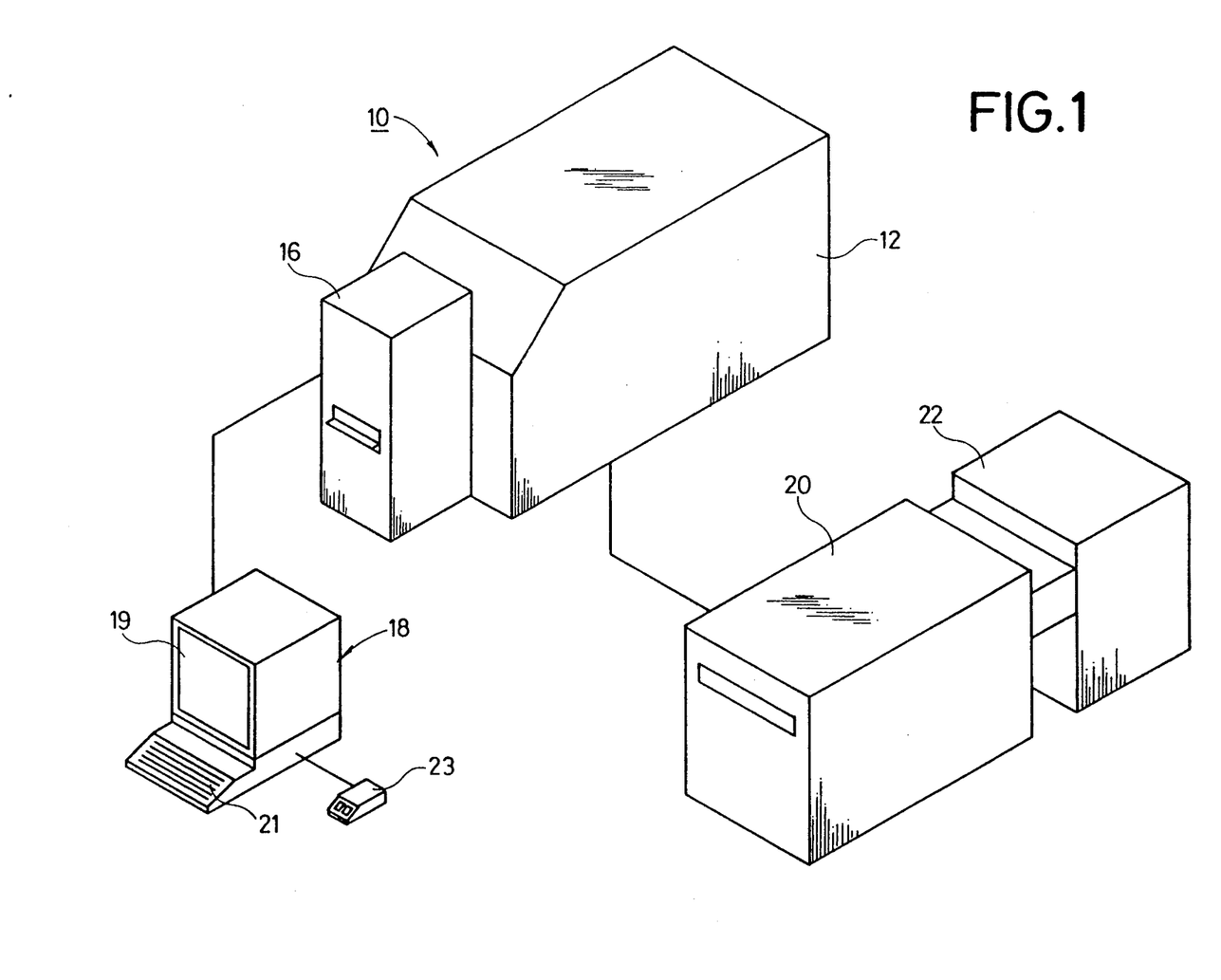
FIG. 1 is a diagram showing the structure of an image scanning reading and reproducing system to which the present invention is applied.

Referring to FIG. 1, designated at numeral 10 is an image scanning reading and reproducing system. The image scanning reading and reproducing system 10 basically comprises an image processing apparatus 12 according to the present embodiment, an original cassette feeding apparatus 16 capable of automatically feeding an original cassette 14 (see FIG. 2) with either a color calibration chart to be described later or an original S to be read held therein, to the image processing apparatus 12, a console 18 for controlling the image processing apparatus 12, an image output apparatus 20 for reproducing image information read by the image processing apparatus 12 on a photographic film as an output, and an automatic developing machine 22 for developing the film to produce an original film plate. Incidentally, the console 18 is provided with a CRT display 19 used to display image information or the like, a keyboard 21, and a mouse 23.

Figure 2:
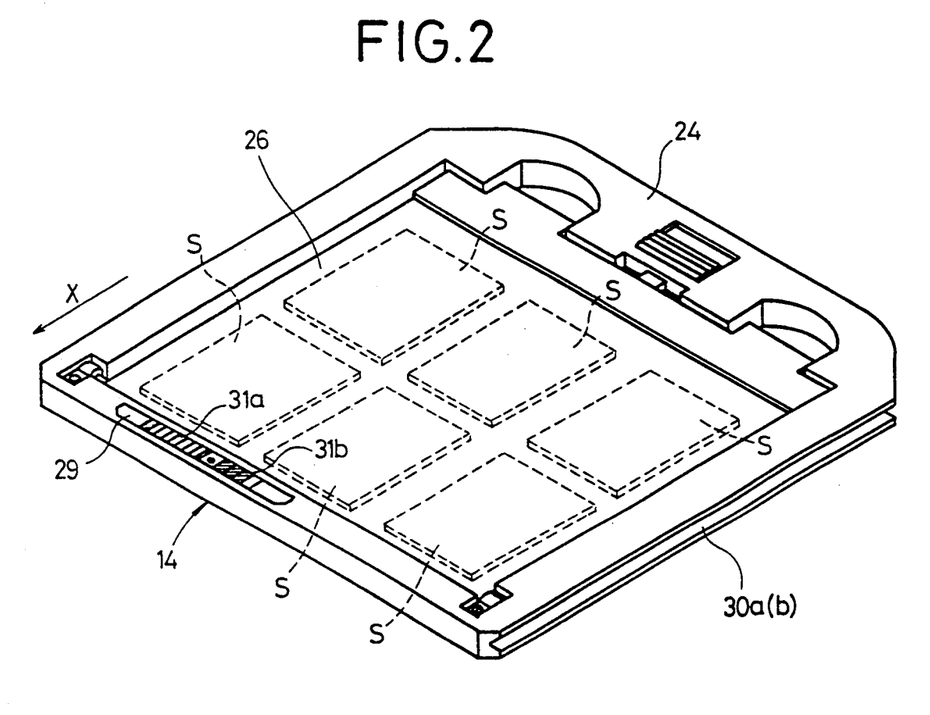
FIG. 2 is a perspective view of an original cassette with which the system shown in FIG. 1 is charged.

As shown in FIG. 2, the original cassette 14 which is fed to the original cassette feeding apparatus 16 and the image processing apparatus 12 is used to hold either a plurality of transmissive originals S to be read or a calibration chart to be described later between two support glass panels 26 enclosed by a frame 24 shaped substantially in the form of a square. In addition, the original cassette 14 has V-shaped grooves 30a, 30b which are defined in opposite sides of the frame 24 extending in the direction (i.e., in the direction indicated by the arrow X) to feed the same toward the image processing apparatus 12 and which extend in the direction in which the frame 24 is fed. On the upper surface of the leading end of the frame 24, which extends in the direction in which the frame 24 is fed, there is also disposed a cassette identifying unit 29 for identifying the original cassette 14 and either each original S or the calibration chart stored in the original cassette 14. In order to identify the cassette 14 and either the type of the original S stored in the original cassette 14 or the calibration chart stored therein, the cassette identifying unit 29 is made up of a combination of a plurality of light-transmissive portions 31a and light-intransmissive portions 31b.

Figure 3:
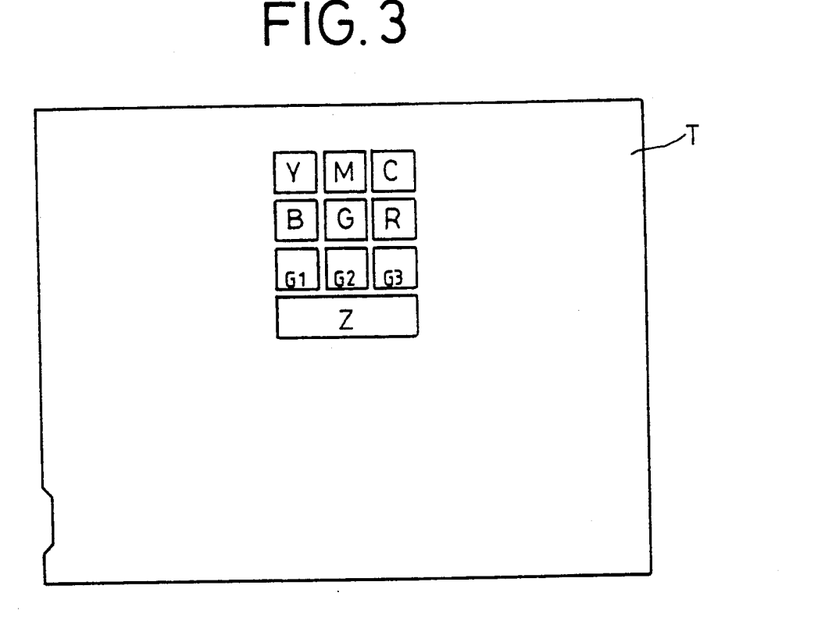
FIG. 3 is a diagram showing the structure of a color calibration chart employed in the present invention.

FIG. 3 shows a calibration chart T in which a photographic film having the same developmental characteristic (the same dye structure) as that of the original S is exposed to light to produce color steps Y, M, C, B, G, R, gray color steps G1, G2, G3 represented as three-step density levels, and a color step Z having the density of a photographic film base itself.

Figure 4:
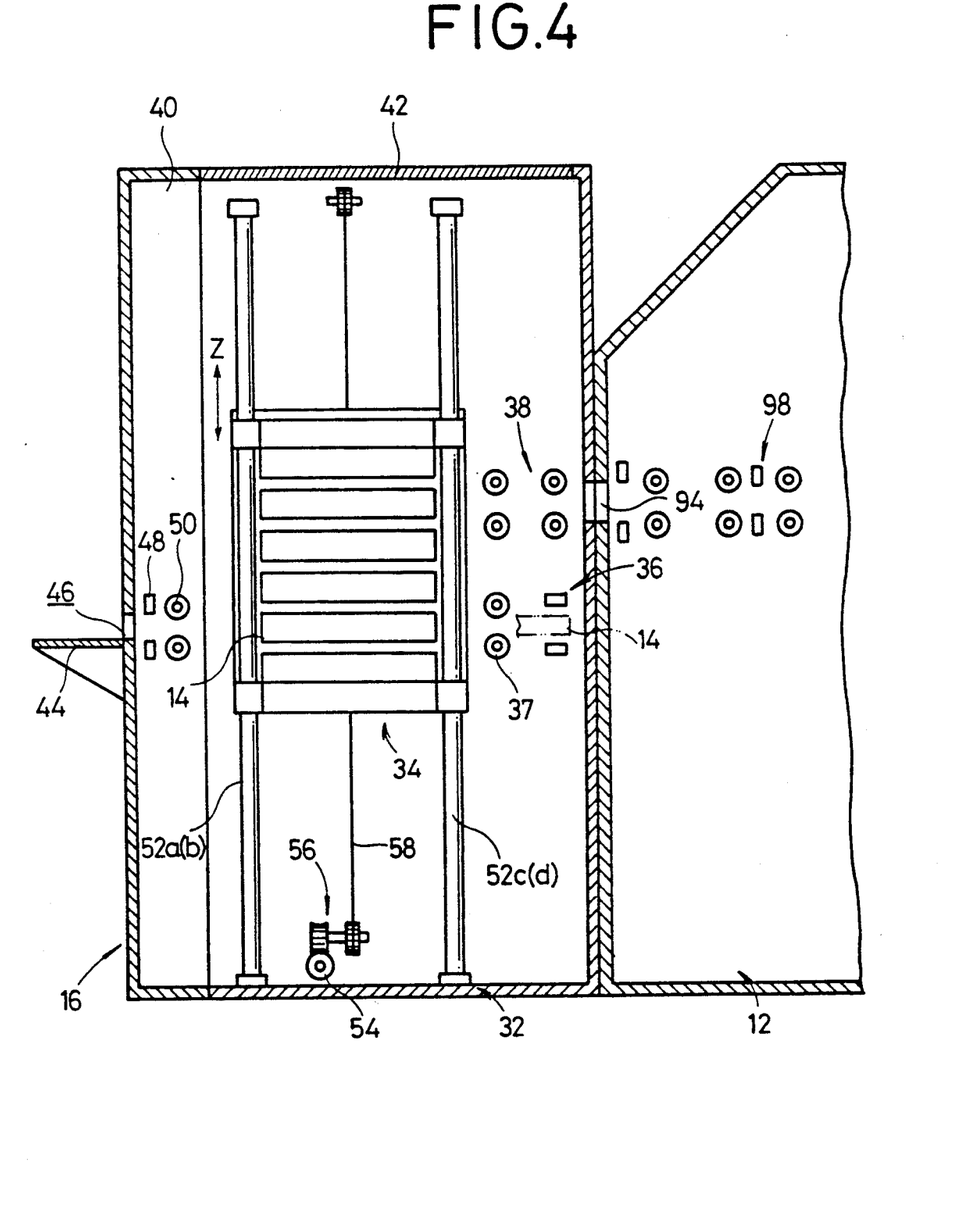
FIG. 4 is a cross-sectional view of an original cassette feeding apparatus shown in FIG. 1.

FIG. 4 shows the structure of the original cassette feeding apparatus 16. The original cassette feeding apparatus 16 is surrounded by a casing 32. In addition, the original cassette feeding apparatus 16 comprises a cassette holding means 34 for accommodating the original cassette 14 therein, a cassette identifying means 36 for identifying the original cassette 14, and a cassette feeding means 38 for feeding the original cassette 14 accommodated in the cassette holding means 34 to the image processing apparatus 12 to which the original cassette feeding apparatus 16 is connected.

The casing 32 has first and second covers 40, 42 whose frontal and upper sides can be opened and closed. The first cover 40 has a cassette insertion table 44 placed in position as viewed from the outside thereof and a cassette insertion slot 46 defined therein in position. There are disposed, in a region corresponding to the insertion slot 46 within the first cover 40, an insertion detecting means 48 such as a photointerrupter, etc. for detecting whether or not the original cassette 14 is inserted into the insertion slot 46 and a pair of feed rollers 50 for feeding the original cassette 14 to the inside of the original cassette feeding apparatus 16.

The cassette identifying means 36 is made up of a combination of a plurality of light-emitting devices and light-detecting devices. In addition, the cassette identifying means 36 reads data set in the cassette identifying unit 29 of the original cassette 14 delivered by a pair of feed rollers 37 so as to identify the original cassette 14, the type of the original S to be read, etc.

The cassette holding means 34 comprises a cage which is supported by four guide bars 52a through 52d upright provided within the casing 32. Further, the cassette holding means 34 can be moved in upward and downward directions (i.e., in the direction indicated by the arrow Z) by a worm gear coupled to an electric motor 54, and a chain 58.

Figure 5:
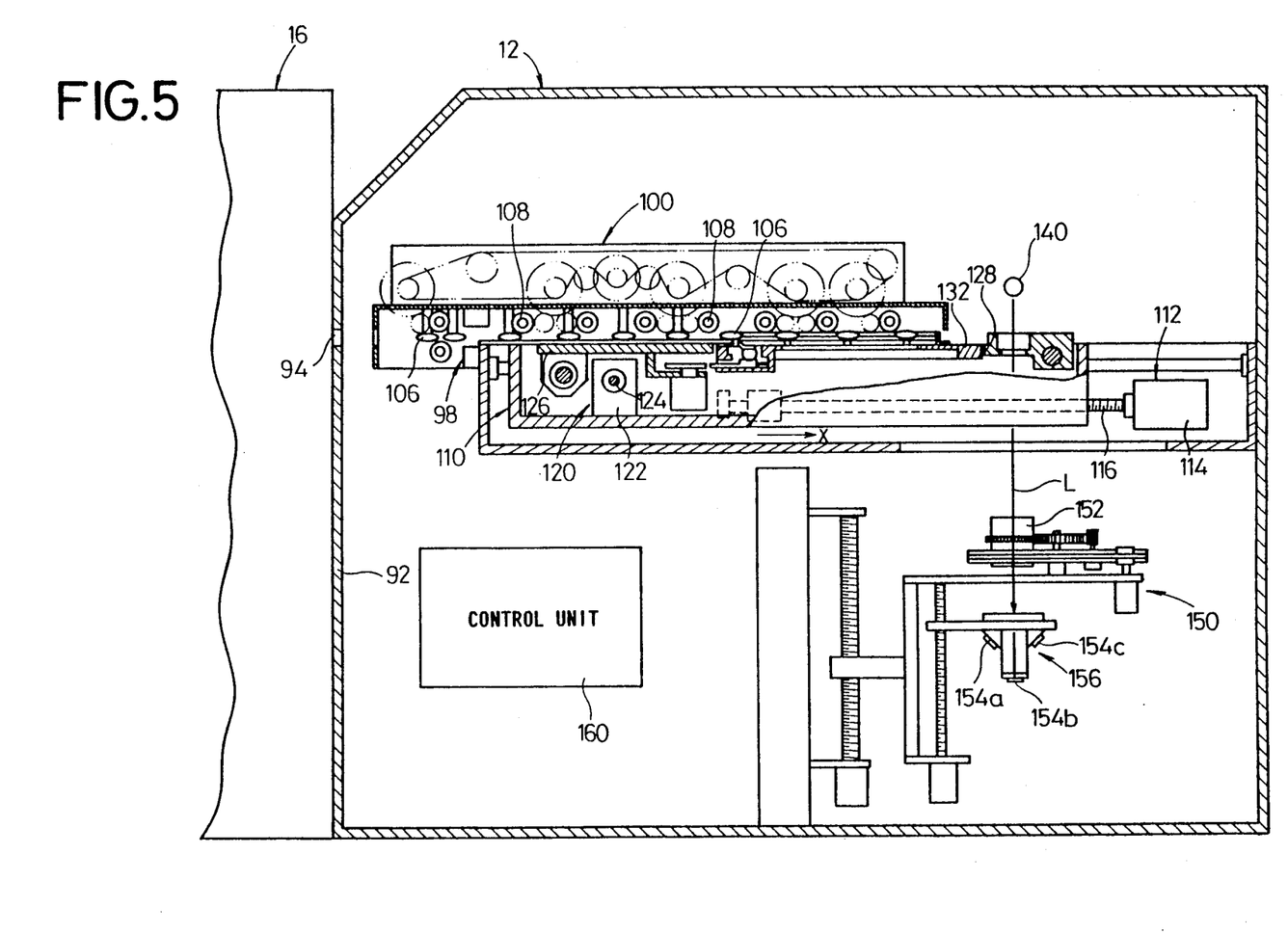
FIG. 5 is a cross-sectional view of an image processing apparatus shown in FIG. 1.

Referring now to FIG. 5, the image processing apparatus 12 has a cassette insertion slot 94 which communicates with the original cassette feeding apparatus 16. There is disposed, near the cassette insertion slot 94, an identifying mechanism 98 for identifying the original cassette 14 and either the type of the original S stored in the original cassette 14 or the calibration chart T. Incidentally, the identifying mechanism 98 is constructed in a manner similar to the cassette identifying means 36 provided in the original cassette feeding apparatus 16.

On the other hand, a feed mechanism 100 has an end disposed near the identifying mechanism 98. The other end of the feed mechanism 100 extends to a position above a turntable to be described later. The feed mechanism 100 includes a plurality of guide rollers 106, which are held in point-to-point contact with the V-shaped grooves 30a, 30b of the original cassette 14. The feed mechanism 100 is brought into contact with a feed surface of the frame 24 of the original cassette 14, and has feed rollers 108 which are rotatably driven. The original cassette 14 is fed in a desired direction by the feed rollers 108. There is disposed, below the feed mechanism 100, an original table 110 which is movable back and forth in an auxiliary scanning direction (indicated by the arrow X) by an auxiliary scanning mechanism 112. The auxiliary scanning mechanism 112 includes a rotative drive source 114 to which there is coupled a ball screw 116 that moves the original table 110 in the direction indicated by the arrow X.

The original table 110 has a trimming mechanism 120 for moving the original cassette 14 back and forth in a trimming direction, i.e., in a direction normal to the auxiliary scanning direction (indicated by the arrow X). The trimming mechanism 120 has a rotative drive source 122 which is mounted on the original table 110 and to which one end of a ball screw 124 is coupled. The ball screw 124 extends in the trimming direction, and is fitted in an unillustrated nut mounted on a trimming table 126, with the other end of the ball screw 124 being supported by the original table 110.

The trimming table 126 has an opening 128 defined therein, in which a turntable 132 is provided. In addition, the trimming table 126 supports thereon an unillustrated mechanism for rotating the original cassette 14 through a predetermined angle.

The housing 92 accommodates therein a light source 140 of a transmissive illuminating mechanism, which extends in a main scanning direction substantially perpendicular to the direction indicated by the arrow X. There is disposed, below the light source 140, an image reading unit 150 for photoelectrically reading illuminating light L emitted from the light source 140. The image reading unit 150 includes a focusing lens 152 and a photoelectric converting unit 156 comprising a plurality of CCDs 154a through 154c. In addition, the image reading unit 150 photoelectrically reads color image information carried by the original S as image information corresponding to the colors of R, G, B.

The image processing apparatus 12 constructed as described above is driven and controlled by a control unit 160. Therefore, the structure of the control unit 160 will now be described below.

Figure 6:
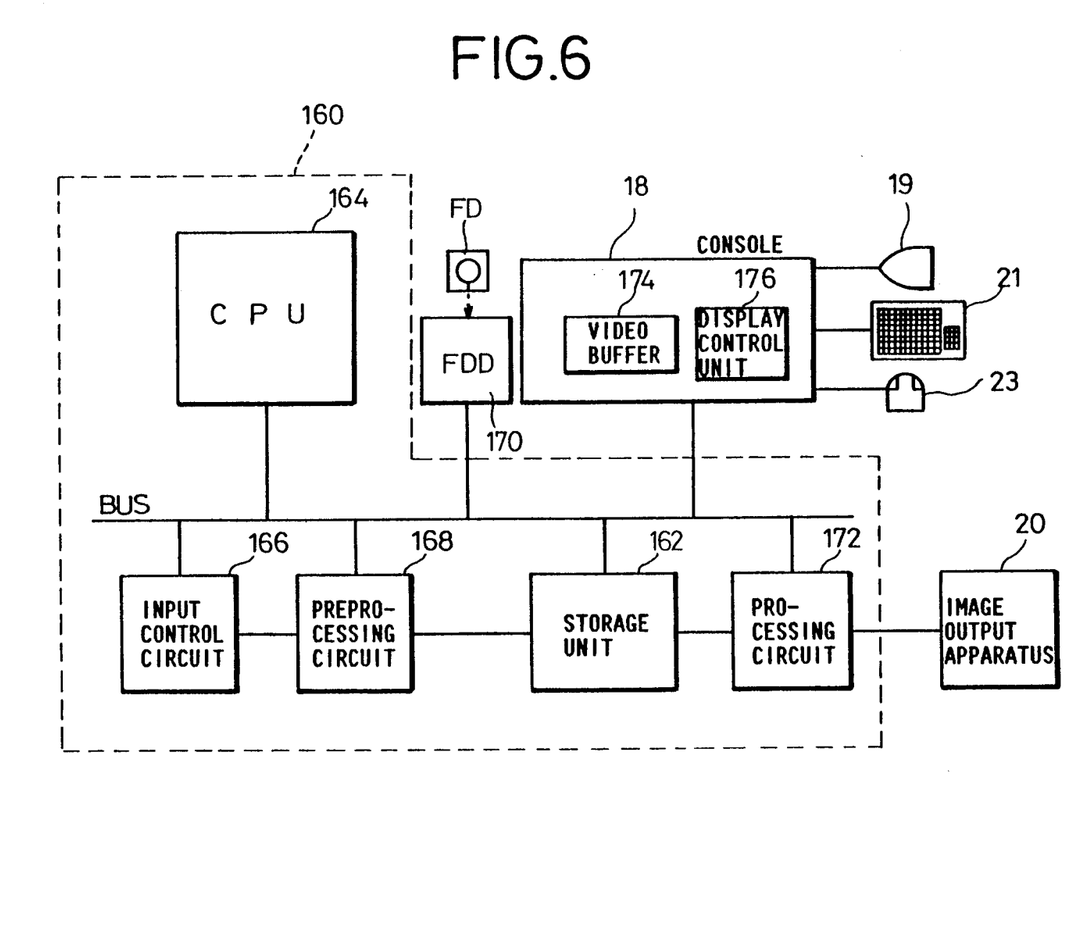
FIG. 6 is a block diagram showing the inside of a control unit shown in FIG. 5.

As shown in FIG. 6, the control unit 160 comprises a CPU 164, an input control circuit 166, a preprocessing circuit 168, a storage unit 162 and a processing circuit 172.

The CPU 164 serves as a color correction data arithmetic unit and generally controls the image processing apparatus 12. The console 18 includes a video buffer 174 and a display control unit 176. The display control unit 176 controls the output supplied to the CRT display 19 incorporated in the console 18, and controls inputs fed from the keyboard 21 and the mouse 23 both electronically connected to the console 18. The input control circuit 166 determines the shape of either the original S or the calibration chart T stored in the original cassette 14 to be read, etc. so as to control its position to be read, etc. The preprocessing circuit 168 supplies the image information read by the input control circuit 166 to the console 18, and serves as a calibration density data arithmetic unit for carrying out a color calibration based on data obtained by reading the calibration chart T. The storage unit 162 serves as a unit for storing therein data indicative of the quantity of dyes, i.e., a dye-quantity data storage unit, and a color-calibration data storage unit. In addition, the storage unit 162 stores pre-scan image data and main-scan image data therein. The processing circuit 172 performs a desired image process with respect to the main-scan image data. Incidentally, an FD driver 170 is electrically connected to the control unit 160, and reads data stored in a flexible disk FD.

Figure 7:
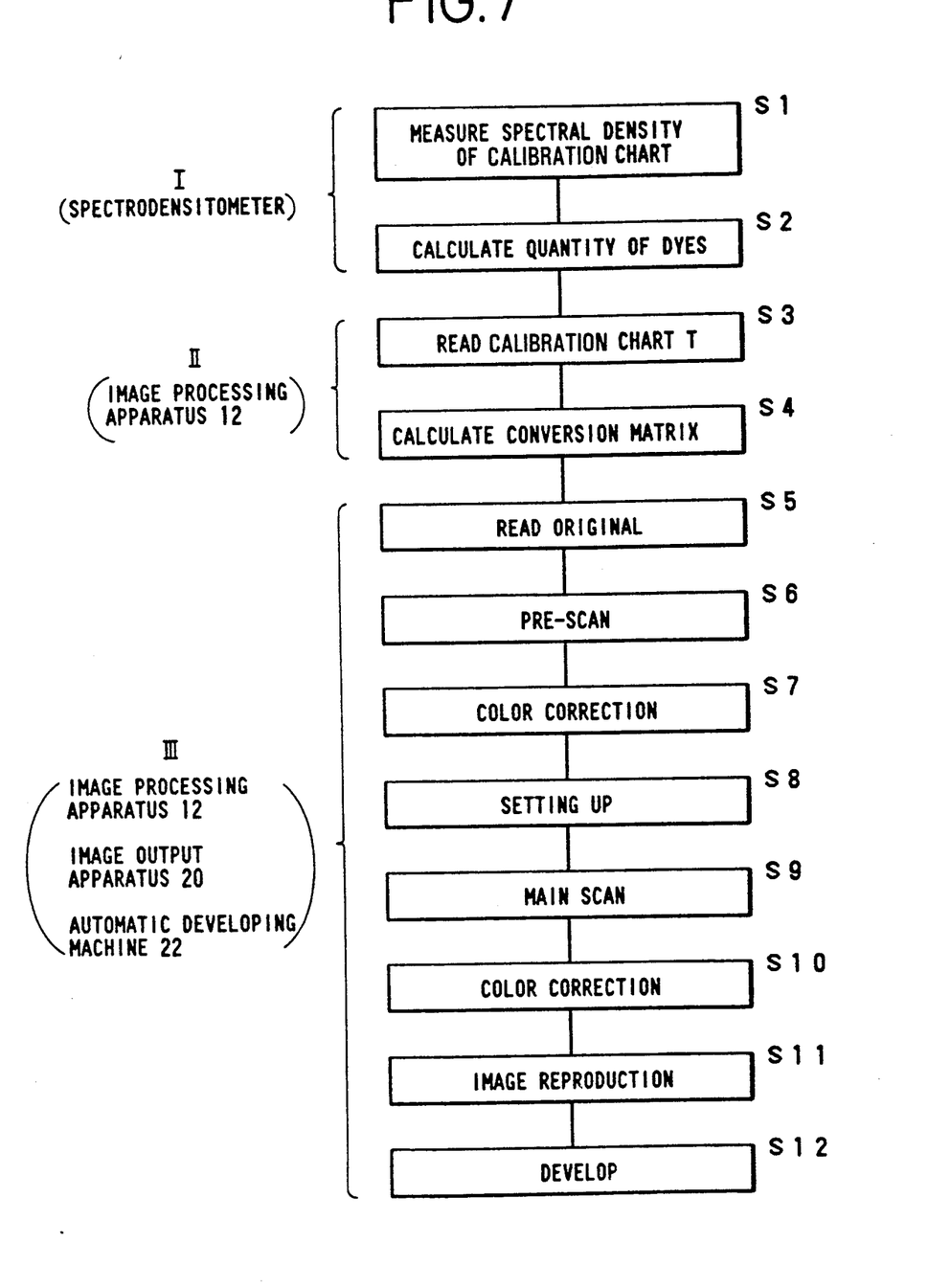
FIG. 7 is a schematic flowchart for describing a processing sequence of the system shown in FIG. 1.

A color calibration method using the correction chart T will now be described with reference to FIG. 7 in the image scanning reading and reproducing system 10 schematically constructed as described above.

I. MEASUREMENT OF THE QUANTITY OF DYES IN THE CALIBRATION CHART T BY A SPECTRODENSITOMETER

First, spectrodensitometer measures the spectral density of each of color steps Y, M, C, R, G, B, G1, G2, G3, Z in the calibration chart T stored in the original cassette 14 (in Step S1). Then, the density of the value obtained by subtracting the value of the spectral density of the color step Z in the film base of the calibration chart T from the value of the spectral density of each of the color steps, Y, M, C, R, G, B, G1, G2, G3 is obtained for every color steps of Y, M, C, R, G, B, G1, G2, and G3.

The respective color steps Y, M, C, R, G, B, G1, G2, and G3 are not necessarily constructed with only each monochrome of Y, M and C. Even in the case of the color step Y, for example, there is a case where it includes an M dye and/or a C dye. Accordingly, the quantity of the dyes of the respective color steps Y, M, C, R, G, B, G1, G2 and G3 is then determined as data q indicative of the quantity of the dyes based on the standard spectral density (which will already be known) of each dye of the pure Y, M, and C (in Step S2).

The dye-quantity data q determined in Step S2 is stored in the flexible disk FD and supplied to the image processing apparatus 12. The image processing apparatus 12 is activated to read the dye-quantity data q stored in the flexible disk FD through the FD driver 170 and store the so-read the dye-quantity data q in the storage unit 162.

II. SETTING UP OF A CONVERSION MATRIX

After the dye-quantity data q is stored in the storage unit 162, the original cassette 14 with the calibration chart T stored therein is inserted into the insertion slot 46 of the original cassette feeding apparatus 16 shown in FIG. 4. At this time, the insertion detecting mean 48 in the original cassette feeding device 16 detects that the original cassette 14 has been inserted into the insertion slot 46. Then, the feed rollers 50 are caused to rotate, thereby charging the cassette holding means 34 with the original cassette 14.

When the original cassette 14 is fed to a predetermined position, and the leading end of the original cassette 14 passes through the feed rollers 37 and reaches the cassette identifying means 36, the data set in the cassette identifying unit 29 mounted on the leading end of the original cassette 14 are read. At this time, the input control circuit 166 identifies that the calibration chart T has been stored in the original cassette 14.

Then, after the original cassette 14 has been returned to a predetermined position of the cassette holding means 34, the motor 54 is energized to cause the worm gear 56 and the chain 58 to move the cassette holding means 34 in the direction indicated by the arrow Z, as seen in FIG. 4. Thereafter, the cassette feeding means 38 is activated to feed the original cassette 14 to the image processing apparatus 12 through the cassette insertion slot 94.

The identifying mechanism 98 in the image processing apparatus 12 is actuated to identify the original cassette 14. Then, the feed rollers 108 are rotated to feed the original cassette 14 to a position above the turntable 132 in a state in which the original cassette 14 has been held by the guide rollers 106 held in point-to-point contact with the V-shaped grooves 30a, 30b.

After the original cassette 14 has been positioned in place on the turntable 132, the auxiliary scanning mechanism 112 is actuated to feed the original cassette 14 in the direction indicated by the arrow X, i.e., in the auxiliary scanning direction together with the original table 110, whereby the original cassette 14 is read by the image reading unit 150. More specifically, the illuminating light L emitted from the light source 140 passes through the calibration chart T stored in the original cassette 14. The illuminating light L is then applied through the focusing lens 152 to the CCDs 154a through 154c of the photoelectric converting unit 156. Each of the CCDs 154a through 154c converts the illuminating light L which passes through the calibration chart T into an electric signal. The electric signal is transferred to the control unit 160 as density data d of each of the color steps Y, M, C, R, G, B, G1, G2, G3 and Z in the calibration chart T (in Step S3).

The CPU 164 of the control unit 160 calculates a conversion on matrix $A_{3\times6}$ for the classification and calibration of colors based on the density data d of each of the color steps Y, M, C, R, G, B, G1, G2, G3 and Z, which is obtained by reading the calibration chart T with the image reading unit 150, and the dye-quantity data q in the calibration chart T, which has previously been stored in the storage unit 162 (in Step S4). Incidentally, $A_{3\times6}$ will represent a matrix having three rows and six columns.

The image reading unit 150 reads, as data, each of the color steps Y, M, C, R, G, B, G1, G2, G3 and Z in the calibration chart T for each channel of Y, M and C. Then, data obtained by subtracting data of the color step Z in the film base of the calibration chart T from the so-read data is stored in the storage unit 162 as density data d. Incidentally, the density data d and the dye-quantity data q will hereinafter be represented in the following manner. Specifically, either the channel or the dye will be denoted by a subscript of a small letter, whereas the color step will be represented by a subscript of a capital letter. For example, where the density data of the color step M is read on a Y-channel base it is denoted by $d_{yM}$; the dye-quantity data of Y with respect to the color step M is represented by $q_{yM}$.

Let's now assume that correction terms extending up to the secondary component are used. A matrix $q_{3\times6}$ comprising dye-quantity data q obtained by the spectrodensitometer, and a matrix $d_{6\times6}$ comprising density data d determined by the image reading unit 150 are represented by the following expressions:

$$q_{3\times6} = \begin{bmatrix} q_yY & q_yM & q_yC & q_yR & q_yG & q_yB \\ q_mY & q_mM & q_mC & q_mR & q_mG & q_mB \\ q_cY & q_cM & q_cC & q_cR & q_cG & q_cB \end{bmatrix} \quad (1)$$

$$d_{6\times6} = \begin{bmatrix} d_yY & d_yM & d_yC & d_yR & d_yG & d_yB \\ d_mY & d_mM & d_mC & d_mR & d_mG & d_mB \\ d_cY & d_cM & d_cC & d_cR & d_cG & d_cB \\ d_yY \cdot d_mY d_yM \cdot d_mM d_yC \cdot d_mC d_yR \cdot d_mR d_yG \cdot d_mG d_yB \cdot d_mB \\ d_mY \cdot d_cY d_mM \cdot d_cM d_mC \cdot d_cC d_mR \cdot d_cR d_mG \cdot d_cG d_mB \cdot d_cB \\ d_cY \cdot d_yY d_cM \cdot d_yM d_cC \cdot d_yC d_cR \cdot d_yR d_cG \cdot d_yG d_cB \cdot d_yB \end{bmatrix} \quad (2)$$

Then, the matrix $q_{3\times6}$ will be defined by:

$$q_{3\times6} = A_{3\times6} \cdot d_{6\times6} \quad (3)$$

Further, the conversion matrix $A_{3\times6}$ which can meet the expression (3) is derived from the expression (3) as follows:

$$A_{3\times6} = q_{3\times6} \cdot (d_{6\times6})^{-1} \quad (4)$$

The conversion matrix $A_{3\times6}$ thus determined is used to carry out a color correction on image data obtained from the original S to be read.

Assuming now that density data for every channels of Y, M, and C, which are obtained from the original S, are $d_y$, $d_m$ and $d_c$ respectively, calibrated density data $q_y$, $q_m$ and $q_c$ is given by the following expression:

$$\begin{bmatrix} q_y \\ q_m \\ q_c \end{bmatrix} = A_{3\times6} \cdot \begin{bmatrix} d_y \\ d_m \\ d_c \\ d_y \cdot d_m \\ d_m \cdot d_c \\ d_c \cdot d_y \end{bmatrix} \quad (5)$$

Accordingly, a desired color reproduction can be carried out based on the density data $q_y$, $q_m$ and $q_c$ thus obtained. However, prior to such a color reproduction process, the conversion matrix $A_{3\times6}$ is applied to density data of the gray color steps G1 through G3 in the correction chart T read by the image reading unit 150, so as to determine dye-quantity data q' of the gray in accordance with the following expression (6):

$$\begin{bmatrix} q'_{yG1} & q'_{yG2} & q'_{yG3} \\ q'_{mG1} & q'_{mG2} & q'_{mG3} \\ q'_{cG1} & q'_{cG2} & q'_{cG3} \end{bmatrix} = A_{3\times6} \cdot \begin{bmatrix} d_{yG1} & d_{yG2} & d_{yG3} \\ d_{mG1} & d_{mG2} & d_{mG3} \\ d_{cG1} & d_{cG2} & d_{cG3} \\ d_{yG1} \cdot d_{mG1} d_{yG2} \cdot d_{mG2} d_{yG3} \cdot d_{mG3} \\ d_{mG1} \cdot d_{cG1} d_{mG2} \cdot d_{cG2} d_{mG3} \cdot d_{cG3} \\ d_{cG1} \cdot d_{yG1} d_{cG2} \cdot d_{yG2} d_{cG3} \cdot d_{yG3} \end{bmatrix} \quad (6)$$

Then, the dye-quantity data q' thus determined is compared with the dye-quantity data q stored in the flexible disk FD so as to check whether or not the conversion matrix $A_{3\times6}$ is valid. If it is judged to be invalid, then the calibration chart T may be replaced by another. A process for measuring and reading the so-replaced calibration chart T can be carried out again. Thus, the color correction can be carried out with higher accuracy than can be expected by a purely manual scan by an operator, by checking the validity of the conversion matrix $A_{3\times6}$ using the gray color steps G1 through G3.

The above-described embodiment has described a case in which the conversion matrix $A_{3\times6}$ is determined by making use of the correction terms up to the secondary component. However, only the primary correction term may be used to determine the conversion matrix $A_{3\times 6}$. In this case, it is unnecessary to use either the color steps Y, M, C or R, G, B in the calibration chart T. A description will hereinafter be made of an example in which the color steps Y, M, C are used.

The image processing apparatus 12 carries out the following calculations in order to determine a conversion matrix $A_{3\times 3}$ from the dye-quantity data of each of the color steps Y, M, C in the calibration chart T, which is measured by the spectrodensitometer and the density data of each of the color steps Y, M, C read by the image reading unit 150.

(1) Let's assume that the peak density ratio of $Y_p:M_p:C_p$ at the time that each gray in the correction chart T is developed is known (it can be calculated in advance from a spectral absorption characteristic).

(2) Assuming that density data of the color step Y obtained by reading the color step Y with the image reading unit 150 are represented by $d_{gY}$, $d_{mY}$, $d_{cY}$, for example, these can be represented by the following expression:

$$\begin{bmatrix} d_{yY} \\ d_{mY} \\ d_{cY} \end{bmatrix} = \begin{bmatrix} b_{11} b_{12} b_{13} \\ b_{21} b_{22} b_{23} \\ b_{31} b_{32} b_{33} \end{bmatrix} \begin{bmatrix} Y_p \\ 0 \\ 0 \end{bmatrix} \quad (7)$$

$$= \begin{bmatrix} b_{11} \cdot Y_p \\ b_{21} \cdot Y_p \\ b_{31} \cdot Y_p \end{bmatrix}$$

Thus, the ratio of $b_{11}:b_{21}:b_{31}$ can be determined. Color components of M and C will not be included in the color step Y.

(3) Similarly, the ratios of $b_{12}:b_{22}:b_{32}$ and $b_{13}:b_{23}:b_{33}$ are respectively determined from density data of the color steps M and C, obtained by reading the color steps M and C with the image reading unit 150.

(4) If $M_p = k \cdot Y_p$, $d_{yY}$ and $d_{yM}$ are respectively given by the following equations:

$$d_{yY} = b_{11} \cdot Y_p \quad (8)$$

$$d_{yM} = b_{12} \cdot k \cdot Y_p \quad (9)$$

Thus, $b_{12}$ can be represented by the following equation:

$$b_{12} = b_{11} \cdot d_{yM}/(k \cdot d_{yY}) \quad (10)$$

(5) The remaining $b_{13}$ and $b_{11}$ can also be obtained in the same manner as described above. If the absolute value of $Y_p$ is given, for example, then the value of the matrix $\{b\}$ can simply be defined.

(6) Finally, the desired conversion matrix $A_{3\times 3}$ is given by the inverse of the matrix $\{b\}$, i.e., an inverse matrix $\{b\}$.

The color correction can be carried out using the conversion matrix $A_{3\times 3}$ determined in the above-described manner.

III. READING OF IMAGE INFORMATION FROM AN ORIGINAL AND RECORDING OF THE SAME

After either the conversion matrix $A_{3\times 6}$ or $A_{3\times 3}$ is determined in the above-described manner, the original cassette feeding apparatus 16 is charged with an original cassette 14 with a desired original S stored therein. Incidentally, the original S to be read is made up of a photosensitive material having the same color development characteristic as that of the calibration chart T used upon setting up of either the conversion matrix $A_{3\times 6}$ or $A_{3\times 3}$.

Similarly to the process of the calibration chart T, the original cassette 14, which has been introduced into the original cassette feeding apparatus 16, is delivered to the image processing apparatus 12. Thereafter, the original cassette 14 is positioned in place on the turntable 132 and fixedly mounted on the original table 110. Then, the reading of image information stored in the original is carried out by the image reading unit 150 (in Step S5). The image reading unit 150 is controlled by the input control circuit 166.

First, the input control circuit 166 roughly reads the original S to be read, i.e., performs a pre-scan operation (in Step S6). Pre-scan image data obtained by the pre-scan operation is subjected to the color correction in the preprocessing circuit 168 using either the conversion matrix $A_{3\times 6}$ or $A_{3\times 3}$ determined in Step S4 (in Step S7). Thereafter, the image data thus color-corrected is temporarily stored in the storage unit 162. At this time, the pre-scan image data obtained from the original S is subjected to the color correction by making use of either the conversion matrix $A_{3\times 6}$ or $A_{3\times 3}$ as correction data set up based on the calibration chart T having the same luminescent characteristic as that of the original S.

Then, the pre-scan image data thus color-corrected is displayed on the CRT display 19 of the console 18. Thus, the operator sets up processing conditions based on the pre-scan image information displayed on the CRT display 19 (in Step S8). Since the pre-scan image subjected to the color correction is displayed on the CRT display 19 in this case, the setting-up of the processing conditions can accurately be performed.

Incidentally, the processing conditions are set up to produce a desired film plate, and can be classified into scanning conditions and image processing conditions. The scanning conditions include a reading range of an original S (trimming), magnification, turning angle at the time of reading of the original S, type of halftone dot at the time of the halftone scanning, the number of lines on the screen, selection of color plates (Y, M, C, B,) in an original film plate, a judgment as to whether or not a border (green) with respect to the original film plate is set up, a judgment as to whether or not a resist mark is present, a judgment as to whether or not an exposure condition at the time of the color separation of the original S is present, etc. On the other hand, the image processing conditions include, for example, highlights and the degree of shadows with respect to the original film plate, setting-up of dot percent, setting-up of gradation, setting-up of color correction, setting-up of sharpness, undercolor removal, etc.

The original cassette 14, which has been subjected to the pre-scanning process (Step S6) and the setting-up process (Step S8), is then scanned (mainscanned) in the image reading unit 150 based on the processing conditions referred to above (in Step S9). Thereafter, image data obtained by the main scanning process is subjected again to the color correction in the processing circuit 168 by making use of either the conversion matrix $A_{3\times 6}$ or $A_{3\times 3}$ (in Step S10), after which the data is temporarily stored in the storage unit 162 as main-scan image data.

Then, the main-scan image data is delivered to the image output apparatus 20, where it is converted into a light signal such as a laser beam. Thereafter, the light signal thus converted is reproduced on a photographic film as an image (in Step S11). The film is transferred to the automatic developing machine 22, where it is developed, thereby making it possible to obtain a desired original film plate (in Step S12).

According to the present invention, as has been described above, a calibration chart having the same color development characteristic as that of an original is used so as to determine calibration data from dye-quantity data obtained by measuring the calibration chart with a spectrodensitometer and density data obtained by reading the calibration chart with an image reading apparatus, whereby image data is corrected using the calibration data thus determined. In this case, the color separation and the color calibration can satisfactorily be carried out in the image reading apparatus. In addition, the color reproduction can stably be performed even when different types of photosensitive materials are used. The validity of the calibration data can be checked based on the dye-quantity data obtained from each gray color step in the calibration chart, thereby making it possible to ensure the calibrated image data.

Having now fully described the invention, it will be apparent to those skilled in the art that many changes and modifications can be made without departing from the spirit or scope of the invention as set forth herein.

What is claimed is:

1. A method of electronically processing an image, said method comprising:
    a first process for measuring respective spectral densities of a calibration chart having at least three regions where respective ones of three primary color dyes in a color photosensitive material are developed;
    a second process for determining dye-quantity data, indicative of the quantity of the primary color dyes in said regions, from the spectral densities obtained in said first process;
    a third process for determining color correction data from density data of said regions, said density data being obtained by reading said calibration chart with an image reading apparatus, and from said dye-quantity data, said dye-quantity data being obtained in said second process; and
    a fourth process for correcting density data obtained by reading an original having the same color development characteristic as that of said calibration chart with said image reading apparatus, by making use of said color correction data obtained in said third process.

2. A method according to claim 1, wherein each of dye-quantity data measured in said second process is of a value of peak density of each primary color dye at each of said regions.

3. A method according to claim 1, wherein said dye-quantity data determined in said second process is free from data indicative of the quantity of dyes in a film base of said calibration chart.

4. A method according to claim 1, wherein said calibration chart includes regions for respective color steps of Y, M, C, R, G and B.

5. A method according to claim 1, wherein said calibration chart includes the regions for the respective color steps of Y, M, C, R, G and B, and regions for three gray color steps having densities different from one another.

6. A method according to claim 1, wherein said calibration chart includes the regions for the respective color steps of Y, M, C, R, G and B, the regions for the three gray color steps having the densities different from one another, and a region for a color step having the density of a film base in a color photosensitive material.

7. A method according to claim 1, wherein said first process is performed by a spectrodensitometer.

8. A method according to claim 1, wherein said fourth process further comprises the steps of:
    pre-scanning said original, thereby generating pre-scan image data;
    color correcting said pre-scan image data by using said color correction data obtained in said third process;
    thereafter setting processing conditions based upon said color corrected pre-scan image data;
    main scanning said original, thereby generating main scan image data;
    color correcting said main scan image data by using said color correction data obtained in said third process; and
    thereafter processing said main scan image data based upon said processing conditions.

9. An image processing apparatus comprising:
    means for storing therein dye-quantity data, indicative of the quantity of dyes in respective regions of a calibration chart having at least three regions where respective ones of three primary color dyes in a color photosensitive material are developed;
    means for reading said calibration chart and an original having the same color development characteristic as that of said calibration chart;
    color-correction data arithmetic means for computing color correction data from density data obtained by reading said calibration chart with said reading means, and said dye-quantity data stored in said storing means;
    mean for storing therein said color correction data; and
    correction density data arithmetic means for computing correction density data from density data obtained by reading said original with said reading means and said color correction data stored in said color correction data storing means, wherein said original and said color calibration chart are disposed within cassettes.

10. An image processing apparatus according to claim 9, wherein said calibration chart includes regions for respective color steps of Y, M, C, R, G and B.

11. An image processing apparatus according to claim 9, wherein said calibration chart includes the regions for the respective color steps of Y, M, C, R, G and B, and regions for three gray color steps having densities different from one another.

12. An image processing apparatus according to claim 9, wherein said calibration chart includes the regions for the respective color steps of Y, M, C, R, G and B, the regions for the three gray color steps having the densities different from one another, and a region for a color step having the density of a film base of a color photosensitive material.

13. An image processing apparatus according to claim 9, wherein said cassettes are delivered to said reading means by a cassette feeding means, said reading means being provided with a cassette insertion slot that communicates with said cassette feeding means.

* * * * *